(12) United States Patent
Nebiker (10) Patent No.: US 10,708,519 B2
(45) Date of Patent: Jul. 7, 2020

(54) STEREO IMAGE CAPTURING SYSTEM HAVING TWO IDENTICAL PANORAMA IMAGE CAPTURING UNITS ARRANGED AT A COMMON SUPPORT STRUCTURE

(71) Applicant: Fachhochschule Nordwestschweiz FHNW, Muttenz (CH)

(72) Inventor: Stephan Nebiker, Liestal (CH)

(73) Assignee: Fachhochschule Nordwestschweiz FHNW, Muttenz (CH)

( * ) Notice: Subject to any disclaimer, the term of this patent is extended or adjusted under 35 U.S.C. 154(b) by 0 days.

(21) Appl. No.: 16/070,120

(22) PCT Filed: Dec. 13, 2016

(86) PCT No.: PCT/EP2016/080836
§ 371 (c)(1),
(2) Date: Jul. 13, 2018

(87) PCT Pub. No.: WO2017/121563
PCT Pub. Date: Jul. 20, 2017

(65) Prior Publication Data
US 2019/0020829 A1   Jan. 17, 2019

(30) Foreign Application Priority Data

Jan. 15, 2016   (DE) .................. 10 2016 100 656

(51) Int. Cl.
*H04N 7/00* (2011.01)
*B60R 11/04* (2006.01)
(Continued)

(52) U.S. Cl.
CPC ............. *H04N 5/247* (2013.01); *B60R 11/04* (2013.01); *H04N 5/2251* (2013.01);
(Continued)

(58) Field of Classification Search
CPC . B60R 11/04; B60R 2011/004; H04N 13/243; H04N 5/2251; H04N 5/23238; H04N 5/247
(Continued)

(56) References Cited

U.S. PATENT DOCUMENTS 7,126,630 B1 *  10/2006  Lee .................. H04N 5/225
                                                         348/218.1
9,185,391 B1    11/2015  Prechtl
(Continued)

FOREIGN PATENT DOCUMENTS

JP      2013069235 A    4/2013

OTHER PUBLICATIONS

Paparoditris, Nicola et al., "Stereopolis II: A Multi-Purpose and Multi-Sensor 3D Mobile Mapping System for Street Visualisation and 3D Metrology", Revue Franciaise de Photogrammetrie et Teledetection, 2012, pp. 69-79 (Year: 2012).*
(Continued)

*Primary Examiner* — Jessica M Prince
(74) *Attorney, Agent, or Firm* — Murphy, Bilak & Homiller, PLLC (57) ABSTRACT

A stereo image capturing system includes two identical panorama image capturing units arranged at different end sections of a common support structure. Each panorama image capturing unit includes first image capturing sensors including corresponding first optical elements and a second image capturing sensor including corresponding second optical elements. A second imaging plane is determined by the second capturing image sensor and respective first imaging planes are determined by the first image sensors. The identical panorama image capturing units are arranged at different end sections of a common support structure. The end sections and the panorama image capturing units are
(Continued)

arranged on a connection axis, such that the panorama image capturing units are aligned in such a manner that the two second imaging planes lie parallel to each other.

28 Claims, 4 Drawing Sheets

(51) Int. Cl.
    *H04N 5/247*     (2006.01)
    *H04N 5/225*     (2006.01)
    *H04N 13/243*     (2018.01)
    *H04N 5/232*     (2006.01)
    *B60R 11/00*     (2006.01)

(52) U.S. Cl.
    CPC ....... *H04N 5/23238* (2013.01); *H04N 13/243* (2018.05); *B60R 2011/004* (2013.01)

(58) Field of Classification Search
    USPC .......................................................... 348/36
    See application file for complete search history.

(56) References Cited

U.S. PATENT DOCUMENTS

| | | | |
|---|---|---|---|
| 2006/0072020 A1* | 4/2006 | McCutchen | G03B 17/02 348/218.1 |
| 2010/0033371 A1 | 2/2010 | Kumagai et al. | |
| 2011/0164108 A1 | 7/2011 | Bates et al. | |
| 2012/0105574 A1 | 5/2012 | Baker et al. | |
| 2014/0132706 A1 | 5/2014 | Kira et al. | |
| 2016/0063703 A1* | 3/2016 | Sasaki | G06T 7/20 348/135 |
| 2016/0377707 A1* | 12/2016 | Sasaki | G01S 7/497 356/4.01 |
| 2017/0227361 A1* | 8/2017 | El-Sheimy | G01C 21/20 |

OTHER PUBLICATIONS

Paparoditris, Nicola, et al., "Stereopolis II: A multi-Purpose and Multi-Sensor 3D Mobile Mapping System for Street Visualization and 3D metrology", Revue Franciaise de Photogrammertrie et Teledection, 2012, pp. 69-79 (Year: 2012).*

"Earthmine Launches 3D Mapping System Driven by GPS, Inertial", Inside GNSS, Apr. 8, 2009, accessed online at hittp://insidegnss.com/node/1430 on Dec. 2, 2016.

"Eyesis4Pi", Elphel, 2017, Accessed online Jul. 13, 2018 at https://www3.elphel.com/eyesis-4pi.

"Mobile Mapping Solutions", Earthmine, Inc., Copyright 2014, accessed online at earthmine.comihtml/products_mobile.html on Nov. 30, 2016, pp. 1-2.

Anguelov, Dragomir, et al., "Google Street View: Capturing the World at Street Level", IEEE Computer Society, vol. 43, Issue 6, Jun. 2010, pp. 32-38.

Cavegn, S., et al., "Evaluation of Matching Strategies for Image-Based Mobile Mapping", ISPRS Annals of the Photogrammetry, Remote Sensing and Spatial Information Sciences, vol. II-3/W5, 2015, ISPRS Geospatial Week 2015, Sep. 28-Oct. 3, 2015, La Grande Motte, France, pp. 361-368.

Paparoditis, Nicolas, et al., "Stereopolis II: A Multi-Purpose and Multi-Sensor 3D Mobile Mapping System for Street Visualisation and 3D Metrology", Revue Frangaise de Photogrammetrie et Teledetection, 2012, pp. 69-79.

* cited by examiner

STEREO IMAGE CAPTURING SYSTEM HAVING TWO IDENTICAL PANORAMA IMAGE CAPTURING UNITS ARRANGED AT A COMMON SUPPORT STRUCTURE

The present invention relates to a stereo image capturing system comprising two identical panorama image capturing units, wherein each panorama image capturing unit comprises a number of first image capturing sensors including corresponding first optical elements and a second image capturing sensor including corresponding second optical elements, wherein a second imaging plane is determined by the second image sensor and respective first imaging planes are determined by the first image sensors such that the second imaging plane is aligned orthogonally to all of the first imaging planes and such that the first imaging planes are inclined relative to one another.

For capturing stereo images in a panorama view, in particular in a panorama view of 360°, it is known to attach two camera units with a number of image sensors each on a vertical base, wherein the camera units are arranged in a distance of about one meter above each other. Thereby, the image sensors of the two camera units are aligned equally in pairs such that their respective imaging planes lie in a common plane. Such stereo image capturing systems with camera units arranged vertically above each other are for example known from projects such as Mars Rover of NASA JPL. Further known applications are offered by Earthmine (www.earthmine.com) or rather Here Maps (www.here.com). Furthermore, a stereo-panorama-product (Open Source) with a vertical stereo base Elphel eyesis-4pi is also known (www3.elphel.com/eyesis-4pi).

However, it has become apparent that tile arrangement of camera units on vertical supports is problematic with regard to the stability of the system in motion due to the acting lever forces, particularly because the acting mass (weight of camera units) is located very far away from a bottom attachment point of the vertical supports. These forces can be counteracted by using tensioning cables or struts, though making the construction very complex.

Furthermore, there are data protection concerns regarding the arrangement of cameras at a height of more than 2 meters above the ground as an insight into private areas can be gained from an elevated position by such an arrangement. It is a customary data protection requirement that the camera systems may not be arranged higher than the eyes of a (tall) person usually are, so that ideally only perspectives can be captured by the camera systems which can also be seen by a person passing by coincidentally.

Therefore, it is an object of the invention to provide a stereo image capturing system reducing or even avoiding the above disadvantages.

As a solution it is proposed that the two panorama image capturing units are arranged at different end sections of a common support structure, wherein the end sections and the panorama image capturing units are arranged along a connection axis, in particular on the connection axis, such that the panorama image capturing units are aligned in such a manner that the two second imaging planes lie parallel to each other and such that images of the surroundings can be captured from diametrically different directions by each of the second image capturing sensors using each of the second optical elements.

With this proposed configuration of the panorama image capturing units the support structure can be formed such that the two panorama image capturing units can be arranged particularly in a horizontal direction in such a manner that the images of the surroundings by the first image capturing sensors lie on different sides with regard to a midpoint between the two panorama capturing units. For example, one image of the surroundings can be captured forward and one backward or one to the right side and the other to the left side.

Alternatively, the above problem can also be solved in that the two panorama image capturing units are arranged at different end sections of a common support structure, wherein the end sections and the panorama image capturing units are arranged along a connection axis, in particular on the connection axis, such that the end sections are located between the two panorama image capturing units and the two panorama image capturing units form the respectively outmost element along the connection axis, in particular on the connection axis, wherein respective first imaging planes of the two panorama image capturing units are aligned equally in pairs and wherein the first imaging planes form tangential planes to a cylinder, the cylinder axis of which extends parallel to the connection axis or is the connection axis.

Even with such a buildup of the system the support structure can be formed in such a manner that the two panorama image capturing units are located at diametrical ends of the imaginary connection axis, wherein the connection axis is preferably aligned horizontally or rather substantially parallel to a ground supporting the support construction. By means of the first imaging planes, aligned equally in pairs, of the two panorama image capturing units and the arrangement, inclined relative to one another, of the first imaging planes, thus stereo image pairs can be captured covering a range of 360° around the connection axis or rather around the cylinder axis. Adjacent first imaging planes or rather the center of gravity thereof (intersection of a respective optical axis with the imaging plane) always lie at different heights relative to the ground supporting the system or rather to an element of the support structure.

Preferably, the panorama image capturing units are arranged at the support structure in such a manner that the two second imaging planes intersect the connection axis orthogonally. Thereby, the connection axis can in particular be a substantially horizontally extending axis.

For enabling that stereo image pairs can be captured using the first image capturing sensors with such an arrangement, it is proposed that the panorama image capturing units are aligned relative to each other in such a manner that respective first imaging planes of the two panorama image capturing units are aligned equally in pairs relative to a connection plane which includes the connection axis and is orthogonal to the second imaging plane.

It is preferred that the panorama image capturing units respectively comprise four or more first image capturing sensors, wherein the four or more first imaging planes of each panorama image capturing unit are arranged along the sides of a particularly regular polygon which lies orthogonally to the connection axis.

At each panorama image capturing unit respective first optical axes of the first optical elements can point in different radial directions relative to a hereto orthogonal second optical axis of the second optical elements, wherein two adjacent first optical axes include an angle in the range from 30° to 90°, wherein the angle preferably is 60° to 72°.

In simple terms, thus the imaging planes form shell surfaces of a cylinder with the base area of a polygon, wherein the cylinder axis is formed by the second optical axis or rather the connection axis.

Preferably, the connection axis includes the second optical axes of the second optical elements of the two panorama image capturing units. Hereby, it is guaranteed that the two panorama image capturing units lie on a common optical axis in principle.

Furthermore, the panorama image capturing units can be arranged along the connection axis in a first distance from each other. Arranging in a specified distance from each other, in particular in a distance of about 0.8 to 1.5 meters, enables an optimal capture of stereo image pairs using the first imaging planes correspondingly arranged in a distance to each other, which are aligned equally in pairs or rather lie in a common plane in pairs, as already mentioned above.

As a further development it is proposed that, additionally to the two panorama image capturing units, at least two separate image capturing units with a respective third image capturing sensor and corresponding third optical elements are provided, wherein a respective third imaging plane is determined by the third image sensors. By means of these separate image capturing units, particularly further areas of the surroundings can also be captured by means of stereo images which cannot be captured by the panorama image capturing units with stereo image pairs.

For this purpose it is further proposed that the third imaging planes of two image capturing units are aligned parallel to each other and that the image capturing units are arranged in a distance relative to each other extending orthogonally to the direction of the connection axis of the two panorama image capturing units.

Two separate image capturing units may be allocated to each of the two panorama image capturing units such that two separate image capturing units each comprise a substantially equal alignment of their optical axes like the second optical axis of the allocated panorama image capturing unit. Assuming that the connection axis or rather the second optical axes lies or rather lie in a vertical plane and substantially extend horizontally in this vertical plane, the third optical axes of the separate image capturing units can also lie in vertical planes lying parallel to the vertical plane of the connection axis, wherein the third optical axes can be parallel or equally inclined, for example by an angle up to about 10°, to the substantially horizontal connection axis or rather to the second optical axes.

It is preferred that the support structure is formed by a number of strut-like support elements and configured to arrange, in particular to mount, the panorama image capturing units on a movable or an immovable object. This enables a stable relative positioning of the panorama image capturing units relative to each other irrespective of the fact on which platform or rather on which object the stereo image capturing system is to be used. The support structure can for example be formed of light metal, in particular profiled aluminum supports, such that a sufficient stiffness and dimensional accuracy can be achieved.

The separate image capturing units can also be attachable to or be attached at the support structure.

The stereo image capturing system may also comprise at least one computer unit with a display unit which are configured to control the panorama image capturing units or/and the separate image capturing units. The computer unit can for example be a portable computer (notebook) or a tablet computer coupled with the panorama image capturing units or/and the separate image capturing units by corresponding wireless or wired connections.

In order to enable geo-referencing of image data, it is further proposed that the stereo image capturing system comprises at least one receiver configured to receive signals from navigation satellites and a navigation processing unit configured to process these signals, wherein the navigation processing unit preferably is a part of the computer unit, and an inertial measuring unit for direction determination or/and orientation determination such that a position and orientation of tile stereo image capturing system can be determined by means of the navigation data and the data of the inertial measuring unit.

Particularly, a GNSS receiver forming an inertial navigation system together with the inertial measuring unit can be taken into account as a receiver. Preferably, the inertial measuring unit serves for the orientation or rather direction determination, but can also be used for the position determination for assisting the GNSS position determination.

Due to the use of a number of image capturing units, using the present system and using image-based geo-referencing algorithms it is also conceivable to perform an autonomous operation without an inertial navigation system.

Finally, the invention also relates to a vehicle, particularly a road vehicle or railway vehicle, wherein a stereo image capturing system with at least one of the above-described features is mounted at the vehicle, particularly on a vehicle roof or a platform connected with the vehicle.

Hereafter, the invention is described in an exemplary and non-limiting manner with reference to the accompanying figures.

Figure 1:
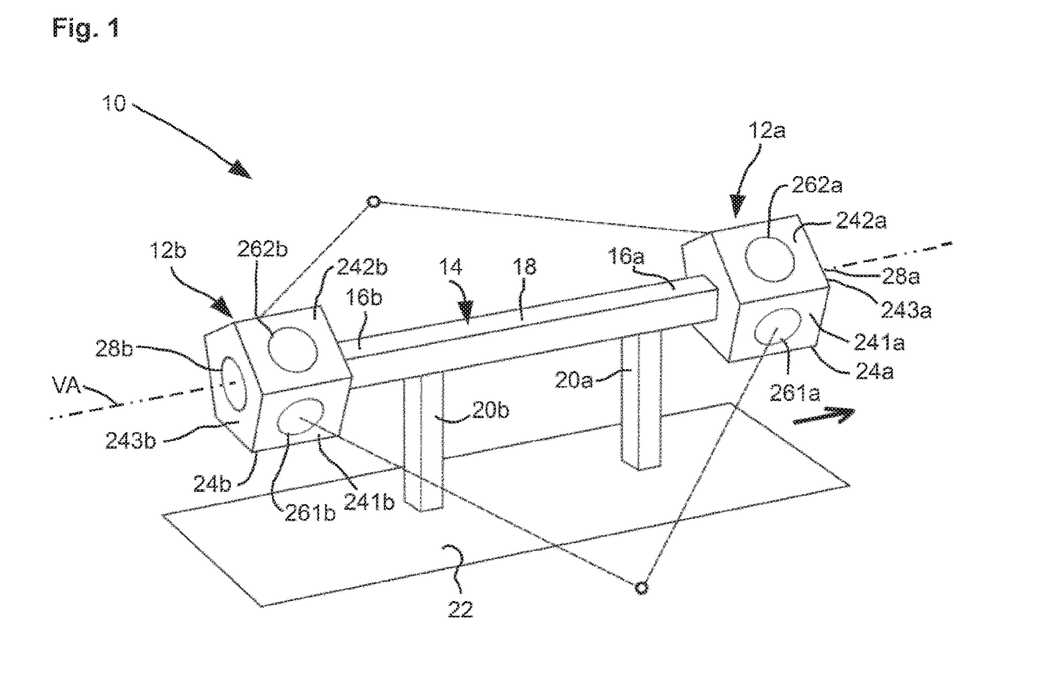
FIG. 1 shows, in a simplified schematic perspective view, a stereo image capturing system comprising two panorama image capturing units at a common support structure.

FIG. 1 shows the basic principle of a stereo image capturing system 10 in a schematic and simplified perspective view. The stereo image capturing system 10 comprises two identical panorama image capturing units 12a and 12b attached at a common support structure 14. Thereby, the panorama image capturing units 12a, 12b are attached at diametrical end sections 16a, 16b of the support structure 14. In the present example the end sections 16a, 16b) are end pieces of a continuous support 18. The support 18 is supported or attached on two struts 20a, 20b. The two struts 20a, 20b can be connected with a base element 22, wherein the base element 22 is here shown as a kind of plate in a simplified and non-limiting manner. The base element 22 may also comprise a frame-like or framework-like construction formed by further supports.

The two panorama image capturing units 12a, 12b comprise a housing 24a and 24b, respectively, and comprise a number of first image capturing sensors each, not visible in the figure, with corresponding first optical elements 261a, 262a and 261b, 262b, respectively. The first optical elements 261a, 262a and 261b, 262b, respectively, are shown as circles in FIG. 1 and may for example comprise one or more lenses of an objective or; and an aperture of the objective or other optical components. Furthermore, the panorama image capturing units 12a, 12b also comprise not visible second image capturing sensors including corresponding second optical elements 28a, 28b.

The first and second image capturing sensors comprise a respective first imaging plane and a respective second imaging plane. Even though these imaging planes are not visible in FIG. 1, but their position in space is exemplarily represented by the respective schematically shown housing surfaces 241a, 242a, 243a and 241b, 242b, 243b respectively, which include respective optical elements 261a, 262a and 261b, 262b and 28a, 28b, respectively. In order to simplify the following description, the reference signs 241a, 242a, 243a and 241b, 242b, 243b, respectively, which have been introduced for the housing surfaces are also used representing the first imaging planes 241a, 242a and 241b, 242b, respectively and the second imaging planes 243a, 243b.

As can be seen from the illustration, all of the first imaging planes 241a, 242a, 241b, 242b are orthogonal to the respective second imaging plane 243a and 243b, respectively. Furthermore, the first imaging planes 241a, 242a, 241b, 242b are inclined relative to one another. According to the illustrated example the panorama image capturing units 12a, 12b each comprise five first image capturing sensors including respective first optical elements (in FIG. 1 only two thereof are visible) and a second image capturing sensor including respective second optical elements.

The two panorama image capturing units 12a and 12a are arranged along or on an imaginary connection axis VA, wherein the panorama image capturing units 12a, 12b are aligned in such a manner that the two second imaging planes 243a, 243b lie parallel to each other and such that images of the surroundings can be captured from diametrically different directions by each of the second image capturing sensors using each of the second optical elements 28a, 28b. In FIG. 1 it is assumed that the connection axis VA includes the optical axes of the two second optical elements 28a, 28b, i.e. these optical axes lie on the connection axis VA. The second imaging planes 243a, 243b are aligned orthogonally to the connection axis VA.

Furthermore, from FIG. 1 it can be seen that the end sections 16a, 16b of the support 18 are located between the two panorama image capturing units 12a, 12b. The two panorama image capturing units 12a, 12b thus form the respectively outmost element along or on the connection axis VA. Respective first imaging planes of the two panorama image capturing units 12a, 12b are aligned equally in pairs, i.e. the imaging planes 241a and 241b as well as 242a and 242b each form a pair aligned equally. The first imaging planes 241a, 242a, 241b, 242b form tangential planes to an imaginary cylinder, the cylinder axis of which extends parallel to the connection axis VA or is the connection VA.

By aligning the respective first imaging planes 241a, 241b and 242a, 242b in space equally in pairs, stereo image pairs of the surroundings may be captured by means of the two panorama image capturing units 12a, 12b. Then these stereo image pairs may for example be used to generate or show or represent three-dimensional models of the surroundings using image processing methods. Therefore, five stereo image pairs may be captured by means of the panorama image capturing units 12a, 12b respectively. This will later be described in more details with reference to FIG. 4.

Figure 2:
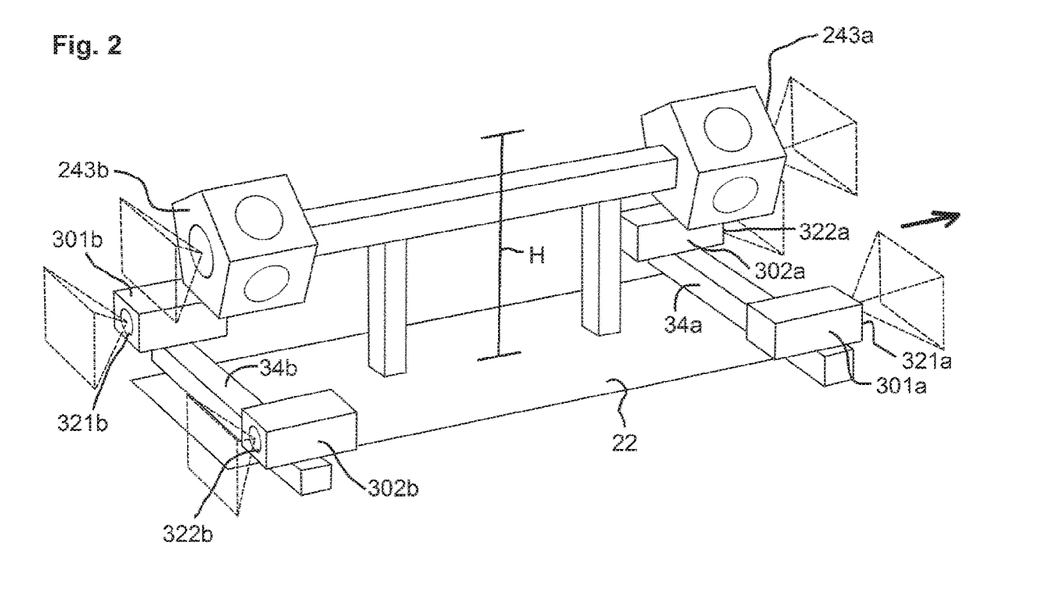
FIG. 2 shows the stereo image capturing system of FIG. 1, supplemented with further image capturing units.

FIG. 2 shows the stereo image capturing system 10 of FIG. 1 comprising additional image capturing units 301a, 302a, 301b, 302b. These additional image capturing units 301a, 302a, 301b, 302b also include a respective not visible third image capturing sensor and corresponding third optical elements 321a, 322a, 321b, 322b. The additional image capturing units 301a, 302a, 301b, 302b are attached at a respective further support 34a, 34b which is also connected with the base element 22. By means of the image capturing units 301a and 302a and 301b, 302b, respectively, stereo image pairs may also be captured. The respective third imaging planes of the image capturing units 301a, 302a, 301b, 302b are aligned parallel to each other. They may also be parallel to the second imaging planes 243a, 243b.

Figure 3:
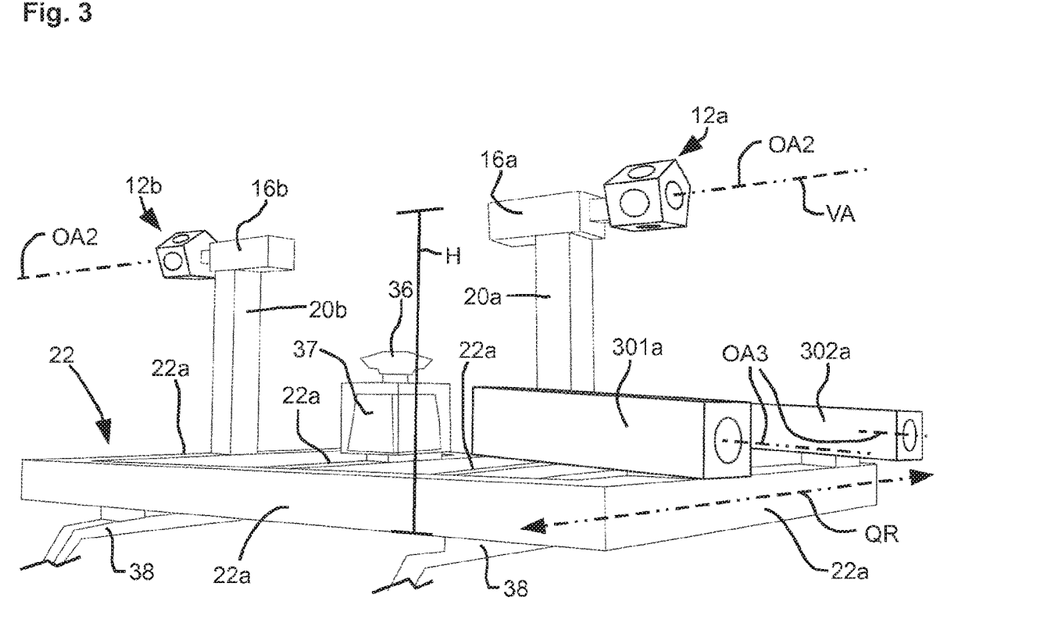
FIG. 3 shows, in a simplified schematic perspective view, a modified stereo image capturing system comprising a modified support structure.

FIG. 3 shows a preferred embodiment of a stereo image capturing system 10 in a simplified perspective view. Also this view shows the panorama image capturing units 12a, 12b attached at different end sections 16a, 16b of the common support structure. In this example the end sections 16a, 16b are separated from each other, i.e. they are not diametrical end pieces of a continuous support (as in FIG. 1). The end sections 16a, 16b are attached on a respective strut 20a, 20b. These struts 20a, 20b are connected with the base element 22 comprising a frame-like construction here formed of a number of supports 22a, Each strut 20a, 20b is attached on one of the supports 22. Two additional image capturing units 301a, 302a are also attached at the base element 22 or rather one of the supports 22a.

Furthermore, a receiver 36 configured to receive signals from navigation satellites, such as GNSS signals, is arranged on the base element 22. Here the antenna 36 exemplifying the receiver is arranged between the two panorama image capturing units 12a, 12b or rather between the struts 20a, 20b. An inertial measuring unit 37 is preferably arranged beneath the antenna 36. The receiver 36 or/and the inertial measuring unit 37 preferably has/have the same distance from the two panorama image capturing units 12a, 12b. The distance shall in particular be minimized here. By this it should be achieved that the lever arms between the receiver (GNSS antenna) 36, the inertial measuring unit 37 and the image capturing units shall be kept as short as possible and simultaneously as small satellite shadowings as possible occur. The receiver 36 lies in the center between the struts 20a, 20b with regard to the direction of the imaginary connection axis VA. The receiver preferably lies also in the center between the two further imaging capturing units 301a, 301b in a transverse direction QR orthogonal to the connection axis VA. In the present example the receiver 36 is thus located approximately in the center of gravity of an area formed by the frame construction. As the receiver 36 determines the (geographical) position of the complete stereo image capturing system 10, it is advantageous if the different image capturing units capturing stereo image pairs have a minimized distance to this receiver 36 in pairs. This simplifies geo-referencing of the stereo image pairs and, if appropriate, also of image contents or rather pixels of the captured images. Minimizing the distances particularly results in an improved stability of the support platform wherein an increased stability also results in a more accurate orientation determination.

The two panorama image capturing units 12a, 12b comprise a common optical axis OA2 coinciding with the imaginary connection axis VA in the example. The two further image capturing units 301a, 301b have a respective optical axis OA3. As can be seen from FIG. 3, the optical axes OA2 and OA3 lie on parallel vertical planes orthogonally intersecting the respective second and third imaging plane, respectively. In case of projecting the optical axes OA2 and OA3 on a common vertical plane, the two optical axes OA3 lie on each other and are slightly inclined to the optical axis OA2. The angle formed between the optical axes OA2 and OA3 can be up to 10°. In the present example it ranges between about 0.5° to 5°.

FIG. 3 furthermore shows an attachment unit 38 connected with the base element 22 or rather the frame-like arranged supports 22a. This attachment unit 38 can for example be configured to be attached on a roof of a vehicle such that the stereo image capturing unit 10 can be carried along on the roof of the vehicle and the surroundings can be captured by stereo image pairs along the streets. Attaching the base element 22 by means of an attachment unit 38 on a vehicle roof is a non-limiting possibility. It is also conceivable that the base element is provided on a kind of platform connected with a vehicle; for example such a platform could be a part of a railway vehicle.

As arising from a combined view of FIGS. 1 to 3, the stereo image capturing system 10 has a small construction height H (FIGS. 2 and 3). The construction height H ranges between 40 to 80 cm, preferably between about 50 to 60 cm, including the base elements 22, but without an attachment unit 38. The panorama image capturing units 12a, 12b are arranged along the substantially horizontally extending imaginary connection axis VA. As the panorama image capturing units 12a, 12b are not arranged above each other in vertical direction, for example, it can be ensured that none of the panorama image capturing units 12a, 12b will be arranged at a height of more than 2 meters above the ground. The stereo image pairs are captured by the two panorama image capturing units 12a, 12b around the optical axis OA2 or rather the imaginary connection axis VA2, so to speak in circumferential direction around an imaginary cylinder, with the cylinder axis being equal to the connection axis VA.

The mentioned (panorama) image capturing units can also be referred to as cameras or rather a camera system. As panorama image capturing units 12a, 12b cameras of the type LadyBug of the company Pointgrey can for example be used, wherein the attachment of these cameras in the proposed stereo image capturing system is rotated by 90° (forward or rather backward or to the left or rather to the right) compared to the conventional use of such camera types.

Figure 4:
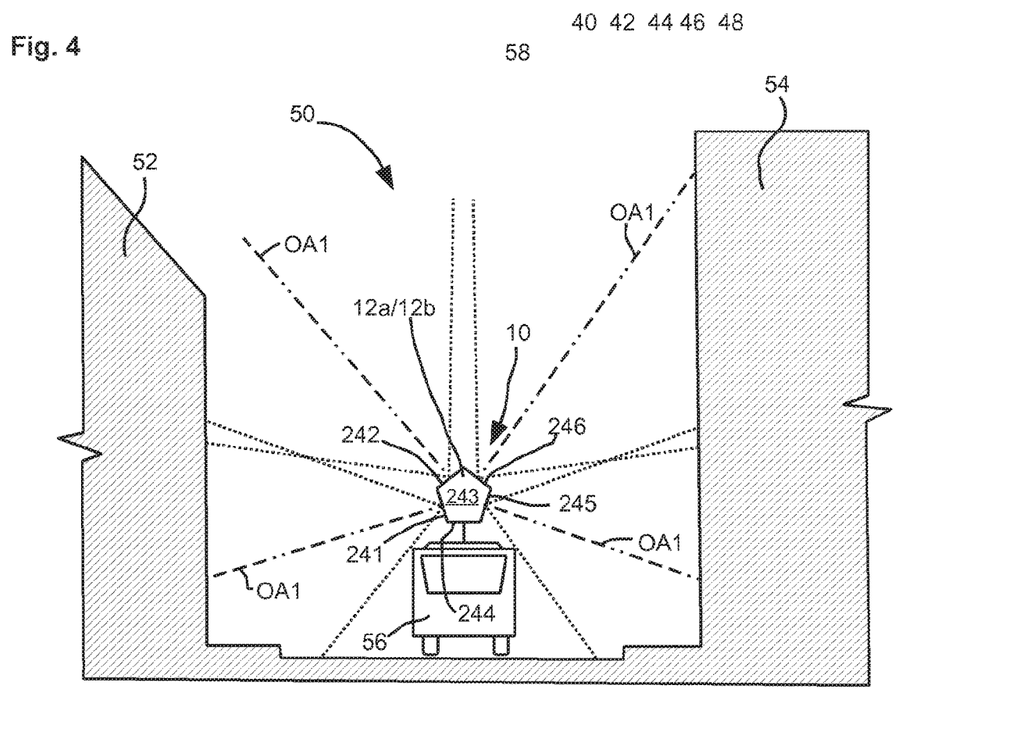
FIG. 4 shows a schematic cross-sectional view of a street and a stereo image capturing system arranged therein.

FIG. 4 shows a greatly simplified schematic cross-sectional view through a street 50 with houses 52, 54 and a vehicle 56 with a stylized stereo image capturing system 10 on its roof. A pentagon representing the panorama image capturing units 12a, 12b is depicted in a stylized manner. The sides of the pentagon are indicated by the reference signs 241, 242, 244, 245 and 246 and represent the respective first imaging planes of corresponding first image sensors. The imaging plane of the second image sensor, lying parallel to or rather in the drawing plane, is indicated by 243.

Respective optical axes OA1 are drawn in a dot-dashed manner for the imaging planes 241, 242, 244, 245, 246. Furthermore, the respective aperture angles of the optical elements are illustrated by dotted lines.

If, for example, a stereo image capturing system 10 according to the embodiment of FIG. 3 is attached on a vehicle roof, such as by using a conventional roof rack, the third image capturing units 301a and 302a may be directed to the front in forward driving direction. Correspondingly, the panorama image capturing unit 12a is arranged at the front and the panorama image capturing unit 12b at the rear. If the stereo image capturing system is now being moved through a street 50, for example the images shown in FIGS. 5 and 6 can be captured.

Figure 5:
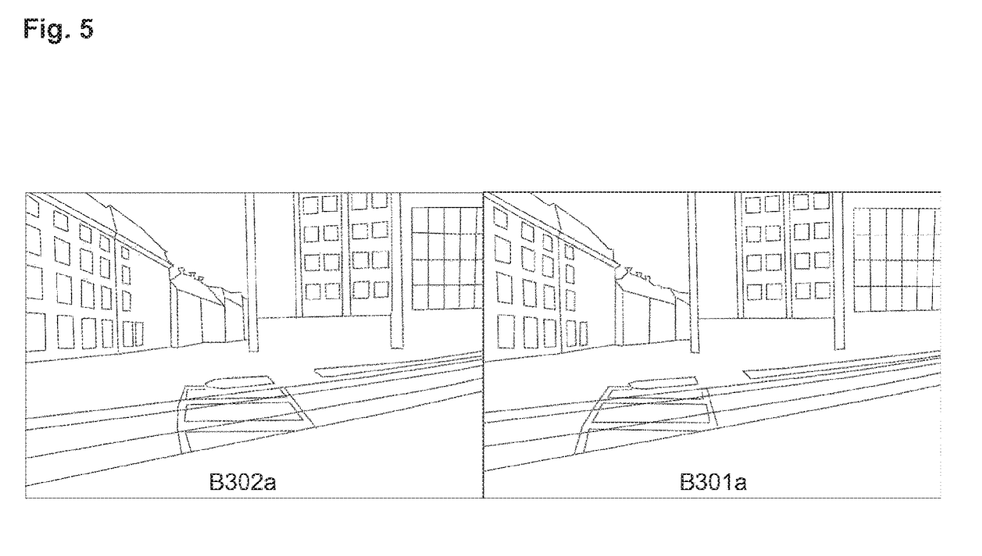
FIG. 5 shows images captured by means of the further image capturing units in a simplified manner.

Here, FIG. 5 shows the images 13301a and 13302a captured by the image capturing units 301a and 302a and which have been captured in front of the vehicle. The images B301a and B302a form a stereo image pair which can be processed for capturing three-dimensional information.

Figure 6:
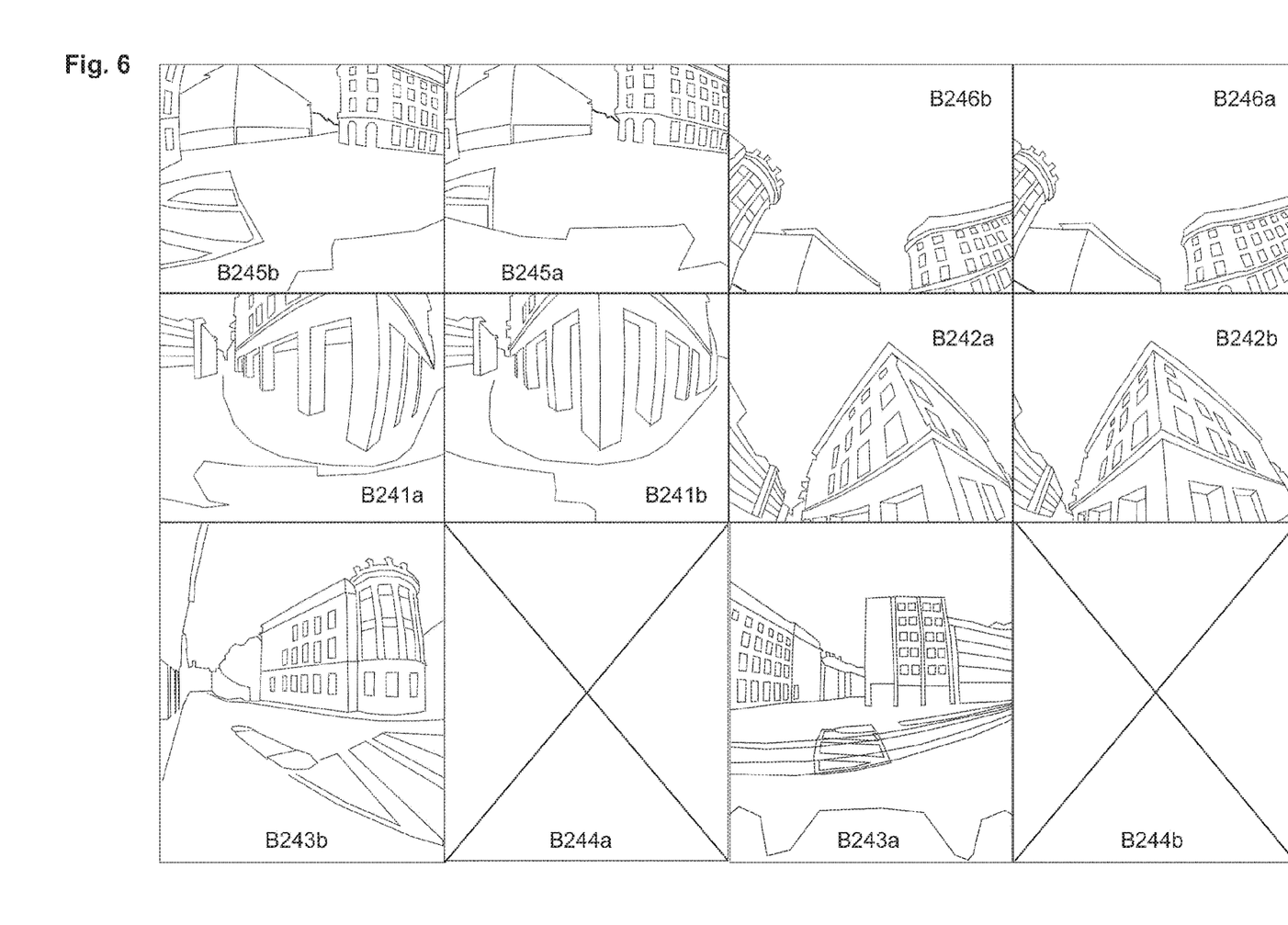
FIG. 6 shows images captured by the panorama image capturing units in a simplified manner.

FIG. 6 shows a collection of the images captured using the two panorama image capturing units 12a and 12b, The numbering of the images relates to the imaging plane (represented by the sides of the pentagon) shown in FIG. 4, wherein the letters a and b provide the allocation to the respective panorama image capturing unit 12a and 12b, respectively.

Correspondingly, the images B243a and B243b show the view in driving direction forward (B243a) and backward (B243b). In the line of images directly above the surroundings located in driving direction on the right side is shown, each with a viewing direction at art angle downwards, images 3241a and 241b and at an angle upwards, images 242a, 242b. The image pairs B241a, B241b and B242a, B242b form respective stereo image pairs. In the top line of images the surroundings located in driving direction on the left side is shown, each with a viewing direction at an angle downwards, images B245a and 3245b, and at an angle upwards, images B246a, B246b. Here the image pairs B245a, B245b and B246a, B246b form respective stereo image pairs. The images B244a, B244b identified by a diagonal cross in the bottom line of FIG. 6 each show the vehicle roof due to the imaging plane 244 faced to the vehicle roof (FIG. 4). These images contain no relevant information for capturing and evaluating the surroundings and are here shown as dummies only.

From the combined view of FIGS. 5 and 6 it can also be seen that the third image capturing units 301a and 301b with their third imaging planes are substantially aligned in the same direction (forward, related to the driving direction) like the imaging plane 243a of the panorama image capturing unit 12a.

As already explained with reference to FIG. 2, the stereo image capturing system 10 may further comprise a pair of third image capturing units 301b and 302b oriented in driving direction backward, even though this has not been explained further with regard to the FIGS. 5 and 6 and no corresponding schematic images are present.

The stereo image capturing system presented here enables to capture each object point of the surroundings in at least two images in a panoramic view of up to 360°. Preferably, the three-dimensional positions of each object point captured by the system are calculated. Thereby, either an interactive image evaluation can be applied or 3D-reconstruction algorithms can be used.

A preferred usage of the stereo image capturing system is in capturing three-dimensional models of the surroundings. Thereby, three-dimensional image spaces are generated which are based on collections of geo-referenced RGB-D-pictures or rather images. With RGB-D-images depth values (D) are also determined in addition to the radiometric RUB values for each point or rather for each pixel of an image. Such geo-referenced RGB-D-images can for example be captured by means of a stereo image capturing system presented above. Depth information is preferably derived by using an image matching.

The stereo image capturing system presented herein further comprises at least one computer unit with a display unit which are configured to control the panorama image capturing units or/and the separate image capturing units in order to ensure a synchronous image capturing. The computer unit, as a mobile computer, may for example be carried along in a vehicle, on the vehicle roof of which the stereo image capturing system is attached. A wireless or wired connection exists between the computer unit and the different image capturing units or rather cameras to exchange corresponding signals. The computer unit is also allocated to a storage unit in which image signals captured by the different image sensors can be stored as image files. The computer unit is preferably also connected with the inertial navigation system comprising the GNSS navigation receiver and the inertial measuring unit and comprises a corresponding application for evaluating navigation signals and inertial measurements for position and orientation determination. The route for example driven with a vehicle is recorded geographically and in terms of time such that due to the time information an exact allocation of captured images to the geographic positions can be performed, for example, continuously or even after completing a tour to enable georeferencing of the captured images.

The invention claimed is:

1. A stereo image capturing system, comprising:
two identical panorama image capturing units, each of which comprises a plurality of first image capturing sensors including corresponding first optical elements and a second image capturing sensor including corresponding second optical elements, a second imaging plane being determined by the second capturing image sensor and respective first imaging planes being determined by the first image sensors such that the second imaging plane is aligned orthogonally to all of the first imaging planes and such that the first imaging planes are inclined relative to one another,
wherein the two identical panorama image capturing units are arranged at different end sections of a common support structure,
wherein the end sections and the panorama image capturing units are arranged on a connection axis, such that the panorama image capturing units are aligned in such a manner that the two second imaging planes lie parallel to each other and such that images of the surroundings from diametrically different directions can be captured by each of the second image capturing sensors using each of the second optical elements,
wherein the two identical panorama image capturing units are arranged at the common support structure such that the two second imaging planes intersect the connection axis orthogonally.

2. The stereo image capturing system of claim 1, wherein the two identical panorama image capturing units are aligned relative to each other such that respective ones of the first imaging planes are aligned equally in pairs with regard to a connection plane which includes the connection axis and lies orthogonally to the second imaging plane.

3. The stereo image capturing system of claim 1, wherein the two identical panorama image capturing units each comprise four or more first image capturing sensors, and wherein four or more first imaging planes of each panorama image capturing unit are arranged along sides of a regular polygon lying orthogonally to the connection axis.

4. The stereo image capturing system of claim 1, wherein at each panorama image capturing unit, respective first optical axes of the first optical elements with respect to an orthogonal second optical axis of the second optical elements point in different radial directions, and wherein two adjacent first optical axes include an angle in the range from 30° to 90°.

5. The stereo image capturing system of claim 4, wherein the connection axis includes the second optical axes of the second optical elements of the two identical panorama image capturing units.

6. The stereo image capturing system of claim 1, wherein the two identical panorama image capturing units are arranged along the connection axis in a first distance from each other.

7. The stereo image capturing system of claim 1, further comprising at least two separate image capturing units including a respective third image capturing sensor and corresponding third optical elements, wherein a respective third imaging plane is determined by the third image sensors.

8. The stereo image capturing system of claim 7, wherein the third imaging planes of two image capturing units are aligned parallel to each other, and wherein the image capturing units are arranged in a distance to each other extending orthogonally to the direction of the connection axis of the two identical panorama image capturing units.

9. The stereo image capturing system of claim 7, wherein two separate image capturing units are allocated to each of the two identical panorama image capturing units such that the two separate image capturing units each comprise a substantially equal alignment of their third optical axes like the second optical axis of an allocated panorama image capturing unit.

10. The stereo image capturing system of claim 7, wherein the common support structure is formed by a plurality of strut-like support elements and configured to attach the two identical panorama image capturing units on a movable or an immovable object.

11. The stereo image capturing system of claim 10, wherein the at least separate image capturing units are configured to be attached to or are attached at the common support structure.

12. The stereo image capturing system of claim 11, further comprising at least one computer unit including a display unit configured to control the two identical panorama image capturing units.

13. The stereo image capturing system of claim 12, further comprising:
at least one receiver configured to receive signals from navigation satellites;
a navigation processing unit configured to process the signals; and
an inertial measuring unit configured for direction determination and/or orientation determination, such that a position and orientation of the stereo image capturing system can be determined by navigation data and the data of the inertial measuring unit.

14. A road or railway vehicle comprising the stereo image capturing system of claim 1, the stereo image capturing system being attached to a roof of the vehicle or on a platform connected with the vehicle.

15. A stereo image capturing system, comprising:
two identical panorama image capturing units, each of which comprises a plurality of first image capturing sensors including corresponding first optical elements, respective first imaging planes being determined by the first image sensors and being inclined relative to one another,
wherein the two identical panorama image capturing units are arranged at different end sections of a common support structure,
wherein the end sections and the two identical panorama image capturing units are arranged on a connection axis such that the end sections are located between the two identical panorama image capturing units and the two identical panorama image capturing units form the respectively outmost element on the connection axis,
wherein respective first imaging planes of the two identical panorama image capturing units are aligned equally in pairs,
wherein the first imaging planes form tangential planes to a cylinder axis which extends parallel to the connection axis or is the connection axis, wherein the two identical panorama image capturing units are arranged at the common support structure such that the two second imaging planes intersect the connection axis orthogonally.

16. The stereo image capturing system of claim 15, wherein the two identical panorama image capturing units are aligned relative to each other such that respective ones of the first imaging planes are aligned equally in pairs with regard to a connection plane which includes the connection axis and lies orthogonally to the second imaging plane.

17. The stereo image capturing system of claim 15, wherein the two identical panorama image capturing units each comprise four or more first image capturing sensors, and wherein the four or more first imaging planes of each panorama image capturing unit are arranged along sides of a regular polygon lying orthogonally to the connection axis.

18. The stereo image capturing system of claim 15, wherein at each panorama image capturing unit, respective first optical axes of the first optical elements with respect to an orthogonal second optical axis of the second optical elements point in different radial directions, wherein two adjacent first optical axes include an angle in the range from 30° to 90°.

19. The stereo image capturing system of claim 18, wherein the connection axis includes the second optical axes of the second optical elements of the two identical panorama image capturing units.

20. The stereo image capturing system of claim 15, wherein the two identical panorama image capturing units are arranged along the connection axis in a first distance from each other.

21. The stereo image capturing system of claim 15, further comprising at least two separate image capturing units including a respective third image capturing sensor and corresponding third optical elements, wherein a respective third imaging plane is determined by the third image sensors.

22. The stereo image capturing system of claim 21, wherein the third imaging planes of two image capturing units are aligned parallel to each other, and wherein the image capturing units are arranged in a distance to each other extending orthogonally to the direction of the connection axis of the two identical panorama image capturing units.

23. The stereo image capturing system of claim 21, wherein two separate image capturing units are allocated to each of the two identical panorama image capturing units such that the two separate image capturing units each comprise a substantially equal alignment of their third optical axes like the second optical axis of the allocated panorama image capturing unit.

24. The stereo image capturing system of claim 21, wherein the common support structure is formed by a plurality of strut-like support elements and configured to attach the two identical panorama image capturing units on a movable or an immovable object.

25. The stereo image capturing system of claim 24, wherein the at least separate image capturing units are configured to be attached to or are attached at the common support structure.

26. The stereo image capturing system of claim 25, further comprising at least one computer unit including a display unit configured to control the two identical panorama image capturing units.

27. The stereo image capturing system of claim 26, further comprising:
    at least one receiver configured to receive signals from navigation satellites;
    a navigation processing unit configured to process the signals; and
    an inertial measuring unit configured for direction determination and/or orientation determination, such that a position and orientation of the stereo image capturing system can be determined by navigation data and the data of the inertial measuring unit.

28. A road or railway vehicle comprising the stereo image capturing system of claim 15, the stereo image capturing system being attached to a roof of the vehicle or on a platform connected with the vehicle.

\* \* \* \* \*